United States Patent Office 3,453,309
Patented July 1, 1969

3,453,309
PHENYLALKYLAMINOETHYL THIOSULFATES
Roger D. Westland, Ann Arbor, Mich., assignor to Parke, Davis & Company, Detroit, Mich., a corporation of Michigan
No Drawing. Filed Oct. 14, 1966, Ser. No. 586,632
Int. Cl. C07c *141/00, 149/24*
U.S. Cl. 260—453                            6 Claims

ABSTRACT OF THE DISCLOSURE

Phenylalkylaminoethyl thiosulfates, optionally substituted by lower alkyl, lower alkoxy, cyclohexyl, chloro, nitro, trifluoromethyl, or methylthio; 2-methoxy-4-methyl-phenylalkylaminoethyl thiosulfates; 6,6,7,8-tetrahydro-2-naphthylalkylaminoethyl thiosulfates; and salts thereof, which are useful as antiradiation agents; and their production by (a) reacting a corresponding aralkyl halide with an alkali metal salt of S-2-aminoethyl thiosulfate, (b) reacting a corresponding 2-[(aralkyl)amino]ethyl disulfide compound with a salt of sulfurous acid in the presence of an oxidizing agent, (c) reacting a hydrohalide salt of a corresponding N-(aralkyl)-aminoethyl halide with a thiosulfate salt in an aqueous solvent medium, and (d) reacting a corresponding 1-(aralkyl)aziridine with thiosulfuric acid or a salt thereof.

SUMMARY AND DETAILED DESCRIPTION

The present invention relates to new organic thiosulfate compounds and to methods for their production. More particularly, the invention relates to new aminoethyl thiosulfate compounds, having in the free acid form the formula

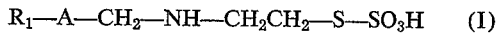

$$R_1\text{---}A\text{---}CH_2\text{---}NH\text{---}CH_2CH_2\text{---}S\text{---}SO_3H \quad (I)$$

and to pharmaceutically-acceptable salts thereof; where $R_1$ represents an unsubstituted phenyl radical, a mono- or di-lower alkyl-substituted phenyl radical, a mono- or di-lower alkoxy-substituted phenyl radical, a mono-substituted phenyl radical in which the substituent is one of the following: cyclohexyl, chloro, nitro, trifluoromethyl, and methylthio, a 2-methoxy-4-methylphenyl radical, or a 5,6,7,8-tetrahydro-2-naphthyl radical; and A represents a linear or branched alkylene radical containing from 3 to 5 carbon atoms.

In accordance with the invention, aminoethyl thiosulfate compounds having the foregoing formula are produced by reacting an alkyl halide compound, having the formula

$$R_1\text{---}A\text{---}CH_2\text{---}X \quad (II)$$

with an alkali metal salt of S-2-aminoethyl thiosulfate, said salt having the formula

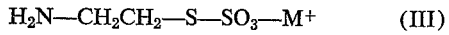

$$H_2N\text{---}CH_2CH_2\text{---}S\text{---}SO_3\text{---}M^+ \quad (III)$$

where M represents an alkali metal, preferably sodium, X is chlorine or bromine, and $R_1$ and A have the aforementioned significance. The reaction is normally carried out in a solvent. Suitable solvents for the purpose include water; lower alkanols, such as methanol, ethanol, and isopropyl alcohol; ethers, such as dioxane, tetrahydrofuran, and 1,2-dimethoxyethane; and tertiary amides, such as N,N-dimethylformamide; as well as mixtures of these. A preferred solvent is 95% ethanol. The temperature of the reaction is not critical and may be varied over a wide range from room temperature to about 150° C. It is most convenient to carry out the reaction at the reflux temperature of the reaction mixture. The duration of the reaction is likewise not critical and will vary widely from several hours to several days, depending on the particular reactants and temperature employed. At the reflux temperature, the reaction is normally complete in about 15-20 hours. While equivalent quantities of reactants may be employed, it is preferable to use a moderate excess of the alkali metal salt of S-2-aminoethyl thiosulfate to insure complete reaction.

The alkyl halide compounds having Formula II above that are used as starting materials in the foregoing procedure can be prepared in a number of ways, as described in greater detail hereinafter. In general, the alkyl halide compounds are obtained from the reaction of an alcohol compound, having the formula

$$R_1\text{---}A\text{---}CH_2\text{---}OH \quad (IV)$$

with a halogenating agent, such as thionyl chloride or phosphorus tribromide. The alkanol compounds of Formula IV can be prepared either by reduction of an appropriately substituted alkanoic acid or ester or by reaction of an appropriately substituted alkyl magnesium halide compound with ethylene oxide followed by hydrolysis of the reaction product mixture.

Also in accordance with the invention, aminoethyl thiosulfate compounds having Formula I and salts thereof are produced by the reaction of a disulfide compound, having the formula

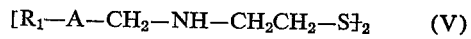

$$[R_1\text{---}A\text{---}CH_2\text{---}NH\text{---}CH_2CH_2\text{---}S]_2 \quad (V)$$

or a mineral acid salt thereof, with a salt of sulfurous acid in the presence of an oxidizing agent in an unreactive solvent medium; where $R_1$ and A are as defined previously. Salts of sulfurous acid that may be used in the reaction include ammonium sulfite, ammonium bisulfite, alkali metal sulfites, alkali metal bisulfites, alkaline earth metal sulfites, and alkaline earth metal bisulfites. When an alkali metal salt of sulfurous acid is employed, an alkali metal bisulfite is preferred over an alkali metal sulfite. The highly preferred sulfurous acid salt is freshly-prepared ammonium sulfite. Oxidizing agents that may be used are air, oxygen, cupric ion, iodosobenzoate ion, and tetrathionate ion. The sulfurous acid salt employed in the reaction also can function as the required oxidizing agent, in which case an additional oxidizing agent is not required. The preferred oxidizing agent, however, is air, and the reaction is most conveniently carried out by bubbling air through the reaction mixture containing the disulfide compound and salt of sulfurous acid until oxidation is complete. Solvents that may be employed in the reaction are water and lower alkanols, such as methanol, ethanol, and isopropyl alcohol, as well as mixtures of these. A preferred solvent is aqueous methanol. The temperature of the reaction is not critical and may be varied. For convenience, with the use of air as the oxidizing agent, the reaction can readily be carried out at room temperature. The duration of the reaction is likewise not critical, and may be varied from about 5 hours to 48 hours, depending on the method of oxidation employed. When air is used as the oxidizing agent as described above, the oxidation is normally complete after a period of 10-20 hours. To insure complete reaction, the chosen salt of sulfurous acid is employed in large excess, that is, approximately 10 to 15 moles or more of sulfurous acid salt is used for each mole of disulfide compound. The oxidizing agent employed is added in an amount sufficient to effect complete oxidation.

When ammonium sulfite is used in the foregoing reaction, the product is obtained in the free acid form, that is, a compound having Formula I. When an alkali metal bisulfite is employed, the product obtained is an alkali metal salt of the aminoethyl thiosulfate compound having Formula I. In the latter case, it is desirable to neutralize the excess alkali metal bisulfite with the corresponding alkali metal hydroxide prior to isolation of the alkali metal salt.

The disulfide compounds having Formula V above that are used as starting materials in the foregoing process are prepared by the oxidation, for example, by reaction with hydrogen peroxide in an alkaline medium, of the corresponding thiol compound, having the formula $$R_1\text{—}A\text{—}CH_2\text{—}NH\text{—}CH_2CH_2\text{—}SH \qquad (VI)$$

or a mineral acid salt thereof; where $R_1$ and $A$ have the same meaning as previously given. The mineral acid salts of the disulfides, which may also be used as starting materials, are prepared by reacting the disulfide with an equivalent amount of mineral acid in an unreactive solvent. The thiol compounds of Formula VI and mineral acid salts thereof can be prepared in a number of ways. For example, an amine compound having the formula $$R_1\text{—}A\text{—}CH_2\text{—}NH_2 \qquad (VII)$$

is reacted with ethyl 2-mercaptoethyl carbonate and the resulting thiol compound of Formula VI is isolated directly or in mineral acid salt form following reaction with a mineral acid such as hydrochloric acid.

Further in accordance with the invention aminoethyl thiosulfate compounds having Formula I are produced by reacting a hydrohalide salt of an aminoethyl halide compound, said salt having the formula $$R_1\text{—}A\text{—}CH_2\text{—}NH\text{—}CH_2CH_2\text{—}X \cdot HX \qquad (VIII)$$

with a thiosulfate salt in an aqueous solvent medium; where $R_1$, $A$, and $X$ have the aforementioned significance. Thiosulfate salts that may be used in this reaction include alkali metal thiosulfates, ammonium thiosulfate, alkaline earth metal thiosulfates, and thallous thiosulfate. The preferred thiosulfate salt is sodium thiosulfate because of its ready availability and ease of use. The solvent medium used for this reaction may be water alone or an aqueous mixture of a lower alkanol, such as methanol, ethanol, or isopropyl alcohol. The temperature of the reaction is not critical; it is most convenient to carry out the reaction at or near the reflux temperature of the reaction mixture. The duration of the reaction is likewise not critical; at the reflux temperature it is normally complete after a period of from about 30 minutes to several hours. The completion of the reaction can be determined by acidifying an aliquot of the reaction mixture with mineral acid; failure of sulfur to precipitate indicates that the reaction is essentially complete. It is preferable to employ equivalent quantities of reactants, although a slight excess of either is not harmful. When an excess of sodium thiosulfate is used, the foregoing test for completion of the reaction cannot be used. The product of the reaction can be isolated by cooling or by concentration of the mixture.

The aminoethyl halide hydrohalide salt compound used as a starting material in the foregoing process can be prepared in different ways. For example, a carboxylic acid chloride having the formula $$R_1\text{—}A\text{—}\overset{\text{O}}{\underset{\|}{C}}\text{—}Cl \qquad (IX)$$

is reacted with 2-aminoethanol, the resulting amide compound having the formula $$R_1\text{—}A\text{—}\overset{\text{O}}{\underset{\|}{C}}\text{—}NH\text{—}CH_2CH_2\text{—}OH \qquad (X)$$

is reduced, and the aminoethanol product having the formula $$R_1\text{—}A\text{—}CH_2\text{—}NH\text{—}CH_2CH_2\text{—}OH \qquad (XI)$$

is reacted with a halogenating agent, such as thionyl chloride, to produce the desired aminoethyl halide hydrohalide salt starting material. In Formulas IX, X, and XI, $R_1$, and $A$ have the same meaning as previously given. Alternatively, this starting material can be prepared by reacting an alkyl halide compound having Formula II above with 2-aminoethanol, and then reacting the aminoethanol product with a halogenating agent.

Further yet in accordance with the invention aminoethyl thiosulfate compounds having Formula I are produced by reacting an aziridine compound having the formula

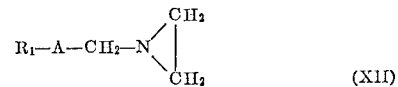

with thiosulfuric acid or a salt thereof; where $R_1$ and $A$ are as previously defined. Suitable salts of thiosulfuric acid that may be used in this reaction are alkali metal thiosulfates, such as sodium thiosulfate, alkaline earth metal thiosulfates, ammonium thiosulfate, and thallous thiosulfate. The reaction is carried out in an unreactive solvent medium, which will vary depending on the thiosulfate reactant used. Suitable solvents for use with thiosulfuric acid are water; lower alkanols, such as methanol and ethanol; ethers, such as diethyl ether, tetrahydrofuran, and dioxane; and lower aliphatic ketones, such as acetone and methyl ethyl ketone; as well as miscible combinations of these. The preferred solvent for use with thiosulfuric acid is methanol. Solvents that may be used for the reaction with an alkali metal thiosulfate, an alkaline earth metal thiosulfate, or thallous thiosulfate are water alone or mixtures of water with any of the following: lower alkanols, dioxane, tetrahydrofuran, 1,2-dimethoxyethane, dimethylsulfoxide, acetone, and methyl ethyl ketone. The preferred solvent is water. In the reaction with ammonium thiosulfate the following solvents may be used: water; lower alkanols, such as methanol and ethanol; ethers, such as diethyl ether, dioxane, and tetrahydrofuran; dimethylsulfoxide; and aromatic hydrocarbons, such as benzene and toluene; as well as miscible combinations of these. The preferred solvent for use with ammonium thiosulfate is methanol.

When an alkali metal thiosulfate, an alkaline earth metal thiosulfate, or thallous thiosulfate is used in the foregoing reaction, sufficient acid must be added to the reaction mixture to maintain neutrality (pH about 7–9). In the usual case, a molar equivalent of any of the following acids will be satisfactory for this purpose: hydrochloric acid, sulfuric acid, nitric acid, perchloric acid, formic acid and acetic acid. Without the acidification step, the reaction will be strongly inhibited by the base that is formed as a secondary product of the reaction. The acidification step is not required when ammonium thiosulfate is used, since the ammonia that is formed as a by-product is not sufficiently basic to inhibit the reaction and may readily be removed from the reaction mixture by heating.

When free thiosulfuric acid is used in this reaction, care must be taken in the preparation and handling of this reactant because of its extreme instability. Free thiosulfuric acid may be prepared by the metathetical reaction of sodium thiosulfate and hydrochloric acid at −78° C. in diethyl ether, or, preferably, by the metathetical reaction of ammonium thiosulfate and sulfuric acid in methanol at −40° C. or below, as described in greater detail hereinafter. For use in the reaction with the aziridine compound of Formula XII above, the preferred methanolic solution of thiosulfuric acid should be prepared just prior to use, since the acid will decompose appreciably if kept longer than 4–6 hours even at a temperature of −30° C. The reaction with the aziridine compound is then best carried out by slowly adding a cold (−20° C. or below) solution of the aziridine starting material to the freshly prepared thiosulfuric acid solution, maintained at about −40° C., allowing the resulting reaction mixture to warm to room temperature, and then isolating the reaction product after a period of about 10 to 20 minutes by adding a suitable precipitating solvent, such as diethyl ether, cooling, and filtering. Longer reaction periods and higher temperatures are neither necessary or desirable. It is preferable to employ equivalent quantities of the aziridine and thiosulfuric acid, although a slight excess of thiosulfuric acid may be used to insure complete reaction.

The conditions for the reaction with a thiosulfate salt are the following. With an alkali metal thiosulfate, an alkaline earth metal thiosulfate, or thallous thiosulfate, the reaction is conveniently carried out at room temperature for a period of about one to four hours. The temperature and duration in these cases are not especially critical, however, and may be varied widely. When ammonium thiosulfate is used, the reaction is best carried out at the reflux temperature of the reaction mixture for a period of about 3 to 4 hours. Other temperatures within the range of 20° to 120° C. and other reaction times, from one hour to 12 hours and longer, may also be used, depending somewhat on the aziridine starting material and solvent chosen. While equivalent quantities of the reactants may be employed in the reaction with any of these thiosulfate salts, to insure complete reaction it is preferable to use an excess of the thiosulfate salt.

The aziridine compounds having Formula XII above that are used as starting materials in the foregoing reaction are prepared by reacting an alkyl halide compound having Formula II above with ethyleneimine in the presence of a base.

The compounds of the invention are new chemical compounds that are useful as pharmacological agents. They are antiradiation agents that are active in protecting against the effects of exposure to X-ray or gamma-ray radiation. They are active upon oral or parenteral administration. Parenteral administration is preferred.

The compounds of the invention can be used either in the free acid form, having Formula I above, or in the form of a pharmaceutically-acceptable salt formed with an alkali metal hydroxide, an alkali metal carbonate, an alkali metal alkoxide, a quaternary ammonium hydroxide, or an alkaline earth metal hydroxide. In the free acid form the compounds of the invention exist as internal salts that may also be represented by the formula

$$R_1-A-CH_2-\overset{+}{N}H_2-CH_2CH_2-S-SO_3^-  \quad (XIII)$$

where $R_1$ and A are as defined previously. Pharmaceutically-acceptable salts of the aminoethyl thiosulfate compounds of the invention are prepared as described above or by reaction of the selected aminoethyl thiosulfate compound in the free acid form with a dilute solution of an equivalent amount of the selected base in an unreactive solvent, such as water or a lower alkanol. The preferred salts are the salts of an alkali metal, which are preferably prepared by reacting a selected aminoethyl thiosulfate compound in free acid form with an equivalent amount of an alkali metal alkoxide in a lower alkanol solvent.

The invention is illustrated by the following examples.

Example 1

To a solution of 30 g. of sodium S-2-aminoethyl thiosulfate in 275 ml. of 95% ethanol, heated under reflux, is added dropwise over 45–60 minutes 27 g. of 4-(p-ethylphenyl)butyl chloride, and the resulting mixture is heated under reflux overnight. The mixture is concentrated to half-volume, 150 ml. of water is added, and the aqueous solution is made slightly acidic (pH 6) with glacial acetic acid. The acid solution is diluted with 725 ml. of water, and the oily precipitate of S-2-{[4-(p-ethylphenyl)butyl]-amino}ethyl thiosulfate that is obtained is isolated by decantation and solidified by treatment with ether; M.P. 210–212° C., following crystallization from water. Additional solid product can be obtained by cooling the decanted aqueous solution.

The potassium salt of S-2-{[4-(p-ethylphenyl)butyl] amino}ethyl thiosulfate is obtained by treating a methanolic solution of 2.0 g. of the free acid at room temperature with an equivalent amount of 10% aqueous potassium hydroxide, evaporating the resulting mixture to dryness under reduced pressure, and crystallizing the solid salt obtained from methanol.

The 4-(p-ethylphenyl)butyl chloride starting material is prepared as follows. To a chilled mixture of 59.5 g. of 4-(p-ethylphenyl)butyl alcohol and 10 drops of pyridine is added dropwise 47.2 ml. of thionyl chloride and the resulting mixture is heated under reflux for 90 minutes, cooled, and poured onto ice. The organic phase, which is the desired 4-(p-ethylphenyl)butyl chloride, is isolated, washed well with 1 N sodium hydroxide, dried, and used without further purification.

Example 2

To a solution of 31.5 g. of sodium S-2-aminoethyl thiosulfate in 275 ml. of 95% ethanol, heated under reflux, is added dropwise 40 g. of 4-(p-cyclohexylphenyl)butyl chloride, and the resulting mixture is heated under reflux overnight. The mixture is concentrated to half-volume, 150 ml. of water is added, and the aqueous solution is made slightly acidic (pH 6) with glacial acetic acid and chilled to precipitate S-2-{[4-(p-cyclohexylphenyl)butyl] amino}ethyl thiosulfate, which is isolated, dried and crystallized successively from methanol and ethanol; M.P. 223–225° C.

The sodium salt of S-2-{[4-(p-cyclohexylphenyl) butyl]amino}ethyl thiosulfate is obtained by treating a methanolic solution of 2.0 g. of the free acid at room temperature with an equivalent amount of sodium methoxide, evaporating the resulting mixture to dryness under reduced pressure, and crystallizing the solid salt from methanol.

The 4-(p-cyclohexylphenyl)butyl chloride starting material, used without purification, is prepared by reacting the corresponding alcohol with thionyl chloride, as described in Example 1 above for the preparation of 4-(p-ethylphenyl)butyl chloride.

Example 3

Utilizing the general procedure described in Example 2 above, the following aminoethyl thiosulfate compounds are prepared from the reaction of the designated alkyl halide compound with sodium S-2-aminoethyl thiosulfate.

(a) From the reaction of 50 g. of 4-(m-methoxyphenyl)butyl bromide with 73.5 g. of sodium S-2-aminoethyl thiosulfate there is obtained S-2-{[4-(m-methoxyphenyl) butyl]amino}ethyl thiosulfate; M.P. 167–169° C., following crystallization from ethanol.

(b) From the reaction of 4-(p-ethoxyphenyl)butyl bromide with sodium S-2-aminoethyl thiosulfate there is obtained S-2-{[4 - (p-ethoxyphenyl)butyl]amino}ethyl thiosulfate; M.P. 206–207° C., following crystallization from ethanol.

(c) From the reaction of 50 g. of 4-(2,4-xylyl)butyl chloride with 56.5 g. of sodium S-2-aminoethyl thiosulfate there is obtained S-2-{[4-(2,4-xylyl)butyl]amino}ethyl thiosulfate; M.P. 214–215° C., following crystallization from ethanol.

(d) From the reaction of 38 g. of 4-(2,5-xylyl)butyl chloride with 43 g. of sodium S-2-aminoethyl thiosulfate in the presence of 1.75 g. of potassium iodide in 670 ml. of 95% ethanol, after a period of reflux of 64 hours, there is obtained S-2-{[4-(2,5-xylyl)butyl]amino}ethyl thiosulfate; M.P. 214–215° C., following crystallization from ethanol.

(e) From the reaction of 4-(3,4-dimethoxyphenyl) butyl bromide with sodium S-2-aminoethyl thiosulfate there is obtained S-2-{[4-(3,4-dimethoxyphenyl)butyl] amino}ethyl thiosulfate; M.P. 166–168° C., following crystallization from ethanol.

(f) From the reaction of 4-(5,6,7,8-tetrahydro-2-naphthyl)butyl chloride with sodium S-2-aminoethyl thiosulfate there is obtained S-2-{[4-(5,6,7,8-tetrahydro-2-naphthyl)butyl]amino}ethyl thiosulfate; M.P. 199–202° C., following successive crystallization from ethanol and from water.

(g) From the reaction of 5-(p-methoxyphenyl)pentyl bromide with sodium S-2-aminoethyl thiosulfate there is obtained S-2-{[5 - (p-methoxyphenyl)pentyl]amino}ethyl thiosulfate; M.P. 181–184° C., following crystallization from ethanol.

The potassium salt of S-2-{[5-(p-methoxyphenyl)pentyl]amino}ethyl thiosulfate is obtained by treating 3.01 g. of the free acid with 10 ml. of 1.0 N potassium hydroxide and evaporating the resulting mixture to dryness under reduced pressure.

(h) From the reaction of 6-(p-methoxyphenyl)hexyl bromide with sodium S-2-aminoethyl thiosulfate there is obtained S-2-{[6 - (p-methoxyphenyl)hexyl]amino}ethyl thiosulfate; M.P. 183–186° C., following successive crystallizations from ethanol and from acetone.

(i) From the reaction of 36.4 g. of 5-(p-nitrophenyl)pentyl chloride with 31.5 g. of sodium S-2-aminoethyl thiosulfate there is obtained S-2-{[5-(p-nitrophenyl)pentyl]amino}ethyl thiosulfate.

(j) From the reaction of 37.9 g. of 4-[m-(trifluoromethyl)phenyl]butyl chloride with 31.5 g. of sodium S-2-aminoethyl thiosulfate there is obtained S-2-[{4-[m-(trifluoromethyl)phenyl]butyl}amino]ethyl thiosulfate.

(k) From the reaction of 36.6 g. of 5-(p-methylthiophenyl)pentyl bromide with 48 g. of sodium S-2-aminoethyl thiosulfate there is obtained S-2-{[5-(p-methylthiophenyl)pentyl]amino}ethyl thiosulfate.

(l) From the reaction of 36.6 g. of 4-(2-methoxy-5-methylphenyl)butyl bromide with 50.9 g. of sodium S-2-aminoethyl thiosulfate there is obtained S-2-{[4-(2-methoxy-5-methylphenyl)butyl]amino}ethyl thiosulfate.

The starting materials used above that are not readily available are prepared as follows.

(1) 4-(m-methoxyphenyl)butyl bromide.—To a solution of 93 g. of 4-(m-methoxyphenyl)butyl alcohol in 500 ml. of ether at −10° C. is added dropwise 16.2 ml. of phosphorus tribromide. The resulting mixture is then allowed to warm to room temperature, stirred overnight, diluted with an equal volume of water and extracted with ether. The ether extract is washed with saturated aqueous sodium bicarbonate, dried, and distilled to give 4-(m-methoxyphenyl)butyl bromide; B.P. 115–117° C./0.3 mm. Hg.

(2) 4-(p-ethoxyphenyl)butyl bromide.—To 16 g. of magnesium powder and a crystal of iodine in 70 ml. of dry tetrahydrofuran under nitrogen is carefully added a small portion of a total of 145 g. of 2-(p-ethoxyphenyl)ethyl bromide (B.P. 97–98° C./03 mm. Hg; prepared as in (1) above from the reaction of 2-(p-ethoxyphenyl)ethanol with phosphorus tribromide in ether). After the reaction is initiated, the remainder of the 2-(p-ethoxyphenyl)ethyl bromide is slowly added while the temperature is kept at 40–45° C., the resulting mixture is stirred at 45° C. for one hour, and a solution of 26.6 g. of ethylene oxide in 100 ml. of tetrahydrofuran is carefully added. This mixture is then heated under reflux for one hour, cooled, hydrolyzed with 200 ml. of 3 N hydrochloric acid, and the hydrolyzed mixture is extracted with ether. The ether extract is dried and concentrated under reduced pressure to give a residue of crude 4-(p-ethoxyphenyl)butyl alcohol. The crude alcohol is then reacted with phosphorus tribromide according to the procedure described in (1) above to give the desired 4-(p-ethoxyphenyl)butyl bromide; B.P. 115–123° C./0.3 mm. Hg.

(3) 4 - (3,4-dimethoxyphenyl)butyl bromide.—4-(3,4-dimethoxyphenyl)butyl alcohol (25 g.) is added dropwise at room temperature to dibromotriphenoxyphosphorane (prepared from 19.2 g. of bromine and 37.2 g. of triphenyl phosphite), and the resulting mixture is extracted with ether. The ether extract is washed with water and with 8% aqueous sodium hydroxide, dried, and distilled to give 4 - (3,4-dimethoxyphenyl)butyl bromide; B.P. 120–142° C./0.25 mm. Hg.

(4) 4-(5,6,7,8-tetrahydro-2-naphthyl)butyl chloride.— This starting material is obtained by reacting 4-(5,6,7,8-tetrahydro-2-naphthyl)butyl alcohol with thionyl chloride according to the procedure described in Example 1 above for the preparation of 4-(p-ethylphenyl)butyl chloride.

(5) 6-(p-methoxyphenyl)hexyl bromide.—To a mixture of 7.4 g. of lithium aluminum hydride and 500 ml. of ether is carefully added a solution of 42.6 g. of 6-(p-methoxyphenyl)hexanoic acid in 100 ml. of ether, and the resulting mixture is heated under reflux for one hour, cooled, and treated carefully with, in succession, 15 ml. of water, 15 ml. of 20% aqueous sodium hydroxide, and 45 ml. of water. The aqueous mixture is filtered, and the ethereal phase is separated, dried, and concentrated to give crude 6-(p-methoxyphenyl)hexyl alcohol. This crude alcohol product (16.4 g.) is reacted with 8.36 g. of phosphorus tribromide in the usual manner to give the desired 6-(p-methoxyphenyl)hexyl bromide; B.P. 128–135° C./ 0.7 mm. Hg.

(6) 4-[m-(trifluoromethyl)phenyl]butyl chloride.—4-[m-(trifluoromethyl)phenyl]butyl alcohol is first prepared from 2-[m-(trifluoromethyl)phenyl]ethyl chloride by reaction of the latter first with magnesium and then with ethylene oxide according to the analogous procedure described in (2) above. The crude intermediate alcohol product is then converted to the desired 4-[m-(trifluoromethyl)phenyl] butyl chloride by reaction with thionyl chloride in the usual manner.

(7) 5 - (p-methylthiophenyl)pentyl bromide.—5-(p-methylthiophenyl)pentyl alcohol is first prepared by reacting 5 - (p-methylthiophenyl)pentanoic acid with lithium aluminum hydride according to the analogous procedure described in (5) above, and the crude intermediate alcohol product is then converted to the desired 5-(p-methylthiophenyl)pentyl bromide by reaction with phosphorus tribromide in the usual manner.

(8) 4 - (2-methoxy-5-methylphenyl)butyl bromide.— This starting material is obtained by reacting 4-(2-methoxy - 5-methylphenyl)butyl alcohol with phosphorus tribromide according to analogous procedures described earlier.

Example 4

To a solution of 0.16 g. of 2 - (4-phenylbutylamino) ethyl disulfide dihydrochloride in 80 ml. of hot ethanol is added an aqueous ammonium sulfite solution (freshly prepared by bubbling 1.0 g. of sulfur dioxide into 7 ml. of water and neutralizing the resulting solution with ammonium hydroxide), and air is passed through the solution obtained for 20 hours at room temperature. The reaction mixture is then heated on a steam bath for 30 minutes, cooled, and the solid S-2-[(4-phenylbutyl)amino]ethyl thiosulfate that precipitates is isolated, dried, and crystallized from ethanol; M.P. 179–180° C. Additional solid product may be obtained by concentrating the first product filtrate and crystallizing the oily residue from water.

The potassium salt of S-2-[(4-phenylbutyl)amino]ethyl thiosulfate is obtained by treating a methanolic solution of 2.0 g. of the free acid at room tempertaure with an equivalent amount of 10% aqueous potassium hydroxide, evaporating the resulting mixture to dryness under reduced pressure, and crystallizing the solid salt from methanol.

The 2 - (4-phenylbutylamino)ethyl disulfide dihydrochloride starting material is prepared as follows. A mixture consisting of 60 g. of 4-phenylbutylamine, 20 g. of ethyl 2-mercaptoethyl carbonate, and 100 ml. of toluene is heated under reflux overnight and then distilled to give 2-(4-phenylbutylamino)ethanethiol, B.P. 103° C./0.5 mm. Hg. This product is dissolved in ether, and the ethereal solution is treated with a slight excess of hydrogen chloride and then evaporated to dryness to give 2-(4-phenylbutylamino)ethanethiol hydrochloride; M.P. 102–108° C., following crystallization from ethanol-ether. A solution of 16.5 g. of 2-(4-phenylbutylamino)ethanethiol hydrochloride in 400 ml. of methanol is treated with 65 ml. of 1.0 N sodium hydroxide and with 100 ml. of 3% hydrogen peroxide solution, kept overnight at room temperature, and then evaporated. The oily residue is washed with water and dissolved in ethanol. The ethanol solution is treated with excess hydrogen chloride and diluted with an equal volume of acetone. The solid 2-(4-phenylbutylamino)ethyl disulfide dihydrochloride that precipitates is isolated, dried, and crystallized from ethanol; M.P. 242–246° C.

Example 5

A mixture consisting of 17.0 g. of 2-(p-chlorophenyl)butylaminoethyl chloride hydrochloride, 6.6 g. of potassium iodide, 12.6 g. of sodium thiosulfate, and 40 ml. of water is heated under reflux for one hour and then chilled to give a solid precipitate of S-2-{[2-(p-chlorophenyl)butyl]amino}ethyl thiosulfate, which is isolated, dried, and crystallized from ethanol; M.P. 198–200° C.

The sodium salt of S-2-{[2-(p-chlorophenyl)butyl]amino}ethyl thiosulfate is obtained by treating a methanolic solution of 2.0 g. of the free acid with an equivalent amount of sodium methoxide, evaporating the resulting mixture to dryness under reduced pressure, and crystallizing the solid salt from methanol.

The starting material is prepared as follows. To a cooled solution of 74 g. of 2-aminoethanol in 600 ml. of methylene chloride is added 119.4 g. of 2-(p-chlorophenyl)butyric acid chloride in such manner so as to maintain the temperature between −5° and +5° C. After addition is complete, the mixture is stirred overnight at room temperature, washed successively with water and with dilute hydrochloric acid, dried and concentrated to give a residue of N-(2-hydroxyethyl)-2-(p-chlorophenyl)butyramide. A solution of 94.3 g. of this crude amide intermediate in 600 ml. of tetrahydrofuran is added dropwise to a slurry of 29.6 g. of lithium aluminum hydride in 900 ml. of tetrahydrofuran at such a rate so as to maintain gentle reflux. The reaction mixture is then heated under reflux for 24 hours more, cooled, and hydrolyzed by treatment successively with water and with 20% aqueous sodium hydroxide. The hydrolyzed mixture is filtered and the organic phase is separated, dried, and concentrated to yield a residue of 2-(p-chlorophenyl)butylaminoethanol. This crude alkanol intermediate (25.1 g.) is chlorinated by reaction with 24.8 g. of thionyl chloride utilizing the procedure described earlier herein for analogous chlorinations.

Example 6

Thiosulfuric acid is prepared according to the following general procedure. To a stirred mixture consisting of 81.5 g. of ammonium thiosulfate and 675 ml. methanol, cooled to −40° C. under nitrogen and kept under a −78° C. condenser, is added dropwise over 30–45 minutes 48 g. of concentrated sulfuric acid, and the resulting mixture is stirred vigorously at 40° C. for 2 hours. Diethyl ether (250 ml.), previously chilled to −40° C., is then added, and the mixture is stirred at −40° C. for an additional 45 minutes, cooled to about −70° C., and vacuum-filtered. During the filtration and following steps, the filtrate is kept in a −70° C. bath. The isolated solid is washed well with cold methanol (−70° C.) and the washings are added to the cold filtrate. The total volume of the filtrate solution is noted, and the solution is kept at −40° C. or below until needed for further use.

To 89.5 ml. of a methanolic solution of thiosulfuric acid, freshly-prepared as described above, containing a total of 4.1 g. of thiosulfuric acid, kept at −40° C., is added a cold solution of 10.3 g. of 1-[4-(p-methoxyphenyl)butyl]aziridine in 50 ml. of ether, and the resulting mixture is allowed to warm to room temperature, and then diluted with 200 ml. of ether. The diluted mixture is cooled to −20° C. and the solid S-2-{[4-(p-methoxyphenyl)butyl]amino}ethyl thiosulfate that precipitates is isolated, dried, and crystallized from ethanol; M.P. 181–182° C.

The sodium salt of S-2-{[4-(p-methoxyphenyl)-butyl]amino}ethyl thiosulfate is obtained by treating a methanolic solution of 2.0 g. of the free acid at room temperature with an equivalent amount of sodium methoxide, evaporating the resulting mixture to dryness under reduced pressure, and crystallizing the solid salt from methanol.

The 1-[4-(p-methoxyphenyl)butyl]aziridine used as starting material is prepared as follows. A mixture consisting of 184.5 g. of 4-(p-methoxyphenyl)butyl bromide, 261 g. of ethyleneimine, 115.5 g. of potassium carbonate, and 950 ml. of ethanol is heated under reflux for 48 hours, cooled, diluted with 750 ml. of chloroform, and the resulting mixture is filtered. The filtrate is concentrated to remove solvent, and the residue is distilled to give the desired 1-[4-(p-methoxyphenyl)butyl]aziridine; B.P. 110–115° C./0.25–0.40 mm. Hg.

I claim:

1. A member of the class consisting of aminoethyl thiosulfate compounds chosen from among S-2-{[4-(m-methoxyphenyl)butyl]amino}ethyl thiosulfate, S-2-{[4-(p - methoxyphenyl(butyl]amino}ethyl thiosulfate, S-2-{[5 - (p-methoxyphenyl)pentyl]amino}ethyl thiosulfate, S - 2 - {[6-(p-methoxyphenyl)hexyl]amino}ethyl thiosulfate, S - 2-{[4-(p-ethylphenyl)butyl]amino}ethyl thiosulfate, and pharmaceutically-acceptable salts of the foregoing compounds.

2. A compound according to claim 1 which is S-2-{[4-(m-methoxyphenyl)butyl]amino}ethyl thiosulfate.

3. A compound according to claim 1 which is S-2-{[4-(p-methoxyphenyl)butyl]amino}ethyl thiosulfate.

4. A compound according to claim 1 which is S-2-{[5-(p-methoxyphenyl)pentyl]amino}ethyl thiosulfate.

5. A compound according to claim 1 which is S-2-{[6-(p-methoxyphenyl)hexyl]amino}ethyl thiosulfate.

6. A compound according to claim 1 which is S-2-{[4-(p-ethylphenyl)butyl]amino}ethyl thiosulfate.

References Cited

Journal of Medicinal Chemistry, vol. 7 (6), pp. 823–824.

CHARLES B. PARKER, Primary Examiner.

S. T. LAWRENCE, Assistant Examiner.

U.S. Cl. X.R.

260—239, 544, 558, 559, 570.5, 570.8, 609, 612, 613, 618, 645, 650, 651; 424—298